United States Patent
Fluri et al.

(10) Patent No.: US 11,858,178 B2
(45) Date of Patent: Jan. 2, 2024

(54) INJECTION MOLD FOR TIMEPIECE COMPONENT

(71) Applicant: ROLEX SA, Geneva (CH)

(72) Inventors: Grégoire Fluri, Lancy (CH); Laurent Mincone, Jonzier-Epagny (FR)

(73) Assignee: ROLEX SA, Geneva (CH)

( * ) Notice: Subject to any disclaimer, the term of this patent is extended or adjusted under 35 U.S.C. 154(b) by 0 days.

(21) Appl. No.: 17/490,044

(22) Filed: Sep. 30, 2021

(65) Prior Publication Data

US 2022/0111565 A1    Apr. 14, 2022

(30) Foreign Application Priority Data

Oct. 12, 2020   (EP) .................................... 20201253

(51) Int. Cl.
| | | |
|---|---|---|
| B29C 33/76 | (2006.01) | |
| B29C 33/44 | (2006.01) | |
| B29C 33/30 | (2006.01) | |
| B29C 45/17 | (2006.01) | |

(52) U.S. Cl.
CPC .......... *B29C 33/442* (2013.01); *B29C 33/301* (2013.01); *B29C 33/76* (2013.01); *B29C 45/1751* (2013.01)

(58) Field of Classification Search
CPC ........ B29C 45/2673; B29C 2045/2677; B29C 33/442; B29C 45/26
See application file for complete search history.

(56) References Cited

U.S. PATENT DOCUMENTS 4,402,657 A * 9/1983 Laghi .................. B29C 45/0416
                                                                425/185
4,416,604 A * 11/1983 Bender ............... B29C 45/2673
                                                                425/572

(Continued)

FOREIGN PATENT DOCUMENTS

| DE | 102013223982 A1 | 5/2014 |
|---|---|---|
| EP | 3670440 A1 | 6/2020 |
| EP | 3670441 A1 | 6/2020 |

OTHER PUBLICATIONS

Thermal expansion of a few steel, Souder, Scientific paper of the Bureau of standard, vol. 17 (Year: 2017).*

(Continued)

*Primary Examiner* — Alison L Hindenlang
*Assistant Examiner* — Debjani Roy
(74) *Attorney, Agent, or Firm* — Seckel IP, PLLC

(57) ABSTRACT

The injection mold has a mold core including a first part and a second part. The parts are mobile relative to one another between a first injection position in which they are moved together to form an injection cavity permitting the injection of a material to form an injected part (50; 50'), and a second demolding position in which they are moved away from one another to permit the demolding of the injected part (50; 50'). The injection mold has at least one ejector designed to contribute to the demolding, and at least one movable intermediate plate (10; 10', 20'), separate from the two parts of the mold core. The intermediate pate is arranged between the two parts of the mold core, and has at least one cutout (12; 12', 22') forming at least one part of the injection cavity of the injection mold.

22 Claims, 4 Drawing Sheets

(56) References Cited

U.S. PATENT DOCUMENTS

| | | | |
|---|---|---|---|
| 5,670,184 A * | 9/1997 | Nakamichi | B29C 45/1639 |
| | | | 425/572 |
| 7,241,405 B1 * | 7/2007 | Crain | B29C 45/2673 |
| | | | 29/402.06 |
| 2020/0201172 A1 | 6/2020 | Calame et al. | |
| 2020/0201173 A1 | 6/2020 | Calame et al. | |

OTHER PUBLICATIONS

European Search Report and Written Opinion dated Mar. 12, 2021 in priority application No. EP20201253.0; with English machine translation (total 13 pages).

* cited by examiner

INJECTION MOLD FOR TIMEPIECE COMPONENT

This application claims priority of European patent application No. EP20201253.0 filed Oct. 12, 2020, the content of which is hereby incorporated by reference herein in its entirety.

INTRODUCTION

The present invention relates to an injection mold and an intermediate plate of such an injection mold. It relates, in particular, to an injection mold which is suitable for micro-injection, in particular for manufacturing timepiece components. It further relates to a method for the manufacture of a timepiece component and a timepiece from such an injection mold.

BACKGROUND ART

The manufacture of timepiece components is particularly difficult, in particular due to the fact that such components have very small dimensions and require very advanced mechanical properties.

One solution for the manufacture of timepiece components consists in using micro-injection, which consists in injecting a material, for example a polymer, a composite, a metal or a ceramic, into an injection mold in order to obtain a component after demolding. Due to the above-mentioned requirements, the existing solutions leave further room for improvement. More specifically, the existing solutions have drawbacks. In particular, a mold for micro-injection is very expensive and does not permit numerous tests and changes in dimensions to be carried out in a simple manner for adjusting a component or improving a component. Moreover, certain components, including those of very small dimensions and of very elongated shape, are difficult to manufacture by micro-injection since it is complicated, in particular, to guarantee their integrity during an ejection phase from the injection mold.

Thus the invention aims to achieve all or some of the following objects.

A first subject of the invention consists in proposing a solution for the manufacture of a component using the injection of material which is compatible with the manufacture of a timepiece component.

A second subject of the invention consists in proposing a solution for the manufacture of a component by injection-molding which permits a high level of precision to be achieved in a robust manner.

A third subject of the invention consists in proposing a solution for the manufacture of a component which is sufficiently flexible to permit iterations for adjusting and/or injection-molding different geometrical variants, without significant additional costs or requiring an excessive time for modifying the injection mold, together with a reliable geometric accuracy.

SUMMARY OF THE INVENTION

To this end, the invention is based on an injection mold comprising a mold core which comprises a first part and a second part which are mobile relative to one another between a first injection position in which said two parts are moved together to form an injection cavity permitting the injection of a material to form an injected part comprising at least one component, and a second demolding position in which said two parts are moved away from one another to permit the demolding of said injected part, and comprising at least one ejector which is designed to contribute to the demolding of an injected component, wherein the injection mold comprises at least one intermediate plate, which is separate from said two parts of the mold core and movable, and which is arranged between said two parts of the mold core, comprising at least one first cutout forming at least one part of the injection cavity of the injection mold.

The invention is specifically defined by the claims.

BRIEF DESCRIPTION OF THE DRAWINGS

These subjects, features and advantages of the present invention will be described in detail in the following description of particular embodiments made in a non-limiting manner relative to the accompanying figures, in which.

DETAILED DESCRIPTION OF PARTICULAR EMBODIMENTS

Figure 1:
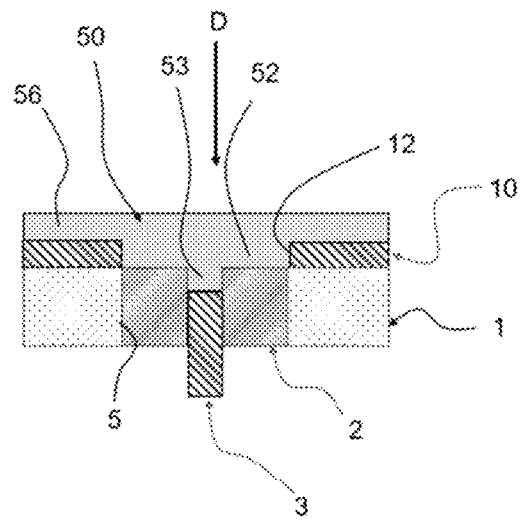
FIG. 1 shows a schematic sectional view of a subassembly of an injection mold according to a first embodiment of the invention.

To facilitate comprehension, the same reference numerals will be used to denote the identical features in the two embodiments, adding the symbol "'" for the second embodiment.

As will be described in detail hereinafter, the concept of the invention is based on the use of a modular injection mold comprising at least one movable intermediate plate. This design permits the injection mold to be modified in a flexible manner simply by changing one or more intermediate plates without having to manufacture the entire mold for each change. For this reason, the invention permits the versatility of an injection mold in a reliable and robust manner.

More specifically, the invention is based on an injection mold comprising a mold core which comprises a first part and a second part which are mobile relative to one another between a first injection position in which said two parts are moved together to form an injection cavity, at least one intermediate plate which is arranged between said two parts contributing thereto, permitting the injection of a material to form an injected blank or a finished part, and a second demolding position permitting the injected part or the finished part to be removed. Such an injected blank comprises at least one component and preferably a plurality of components which are connected together by a sprue tree and/or a support which thus permits the simultaneous injection-molding of a plurality of components. In this case, the components which are injected simultaneously and the support thereof are then separated from the sprue tree by a cutting step. The injection cavity of the injection mold thus makes it possible to manufacture one or more components simultaneously. These potentially multiple components may be identical or different.

The two mobile parts of the core of the injection mold may also adopt a second demolding position in which said two parts are moved away from one another to permit the demolding of an injected blank. To achieve this, the injection mold comprises at least one ejector designed to contribute to the demolding of an injected blank (or component).

According to the invention, the injection mold also comprises at least one intermediate plate, which is separate from said two parts of the mold core and movable, and which is arranged between said two parts of the mold core, comprising at least one first cutout forming a part of the injection cavity of the injection mold.

Figure 6:
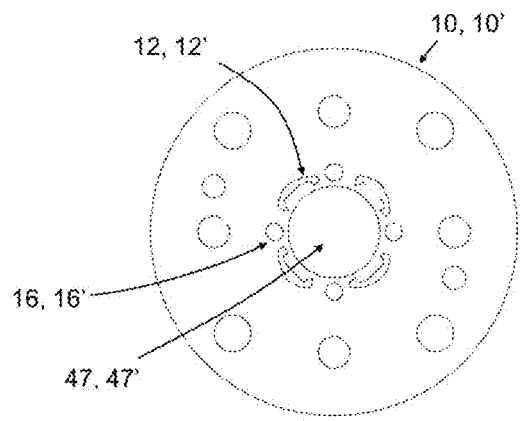
FIG. 6 shows a view from above of a first intermediate plate of the injection mold according to the first or the second embodiment of the invention.

FIG. 1 thus shows a first part 1 of an injection mold core, according to a first embodiment, cooperating with an intermediate plate 10 shown in FIG. 6. This intermediate plate comprises a cutout 12. The subassembly formed by the first part 1 and the intermediate plate 10 defines a cavity which permits the formation of an injected part 50 during an injection phase. It should be noted that, in such a phase, a second part, not shown, of the core of the injection mold cooperates with this subassembly 1, 10 to form a closed cavity.

The second part is moved closer to or away from the first part in a direction of translation D, called the injection direction or the closing direction of the mold. The material is injected from the injection screw into the injection cavity in this same direction D. Advantageously, the two parts of the core of the injection mold and the intermediate plate have substantially planar surfaces which are perpendicular to the injection direction. Moreover, the different ejectors 2, 3 are mobile in this same injection direction D, as described in more detail below.

The first part 1 also comprises a cutout 5 which is superposed on the cutout 12 of the intermediate plate 10 in the injection direction D. A first component ejector 2 is arranged in the cutout 5 of the first part 1. In the injection configuration, this ejector 2 is positioned such that the end thereof is positioned in the extension of the surface of the first part 1. This end thus forms part of the surface of the injection cavity. In other words, it contributes to defining the shape of a component. In addition, a second ejector 3 is arranged in the region of the cutout 5 of the first part 1 of the injection mold in the vicinity of the first ejector 2. In the injection phase, this second ejector 3 also forms a surface of the injection cavity. This surface is retracted relative to the distal surface of the first ejector 2. It permits a part of greater thickness of the injected part 50 to be defined, as will be described in more detail below.

The cutout 12 of the intermediate plate 10 is a through-opening. It is also positioned opposite the cutout 5 of the first part such that the ejectors 2, 3 are positioned according to a shape corresponding exactly to that of the cutout 12 of the intermediate plate. The cutout 12 of the intermediate plate contributes to the formation of the injection cavity of the injection mold, in particular a part of the injection cavity precisely defining a component to be manufactured. More particularly, the flanks of the cutout 12 of this intermediate plate 10 define the contour of the injected component. The cutout 12 also permits the displacement of at least one ejector 2, 3 which is principally guided by the first part 1 of the core of the injection mold, permitting the ejection of a component after an injection phase.

Due to this design of the injection mold, the injection cavity makes it possible to form an injected part 50 comprising a support 56 which connects the separate components together and does not form part of a component to be manufactured. A component is formed by a first portion 52 of the injected part 50 which is superposed on the first ejector 2, and by a second portion 53 of the injected part 50 which is superposed on the second ejector 3.

It is thus apparent that the injection cavity of the injection mold which is designed to form an injected part is principally delimited in the first injection position of the injection mold by:
 the first cutout 12 of the intermediate plate 10,
 an end of a first ejector 2, the end of said first ejector 2 being located flush with one of the faces of the intermediate plate 10, and an end of a second ejector 3, these two ejectors being arranged and guided by the first part 1 of the mold core of the mold, and by
 the second part of the mold core, not shown, which defines the rear face of the injected part 50, for example a planar face.

More specifically, the section of the cutout 12 of the intermediate plate 10 forms the surface of the cavity of the injection mold which defines the periphery of the timepiece component, the lateral surface 62 of the timepiece component, apart from the tenon. It should be noted that, in the illustrated example, the injection mold is used to manufacture a timepiece component, more specifically a winding pawl 60, particularly shown in FIGS. 8 to 10. The second above-mentioned portion 53 forms a tenon 63 of the winding pawl 60 and the first portion 52 forms the lateral part 62 of the winding pawl 60, in particular the beaks 65.

Naturally the invention is not limited to the specific shape of the above-described injection cavity. More specifically, the geometry of the intermediate plate 10 and the two mobile parts of the injection mold could be suitable for forming any other desired component. Similarly, the injection mold could comprise a different number and/or different shapes of component ejectors. Moreover, the intermediate plate 10 of the injection mold may comprise, apart from the described cutout, at least one blind cutout and/or at least one texturization of its surface to form at least one part of the injection cavity having a different geometry.

Figure 2:
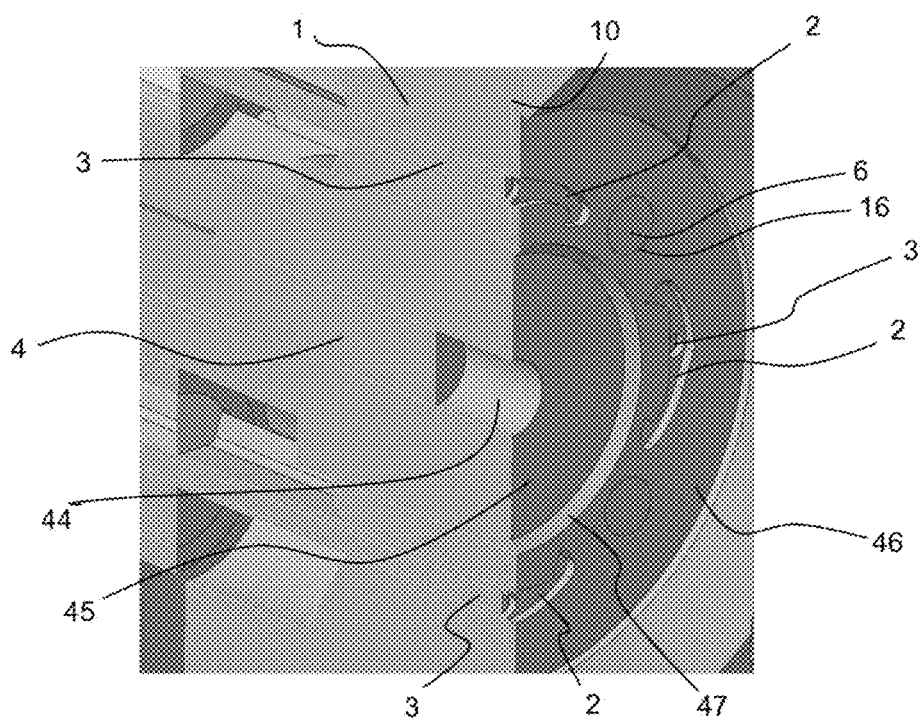
FIG. 2 shows a perspective view of a section of the subassembly of the injection mold according to the first embodiment of the invention.

FIG. 2 shows in more detail a perspective view of the subassembly of the injection mold, in which it appears that the injection mold has a generally cylindrical shape, forming an annular portion 46 on its periphery, a plurality of cavities being arranged therein in the region of the above-mentioned multiple pairs of ejectors 2, 3, said cavities being designed to form a plurality of components, such as for example a plurality of identical winding pawls in this embodiment.

Figure 3:
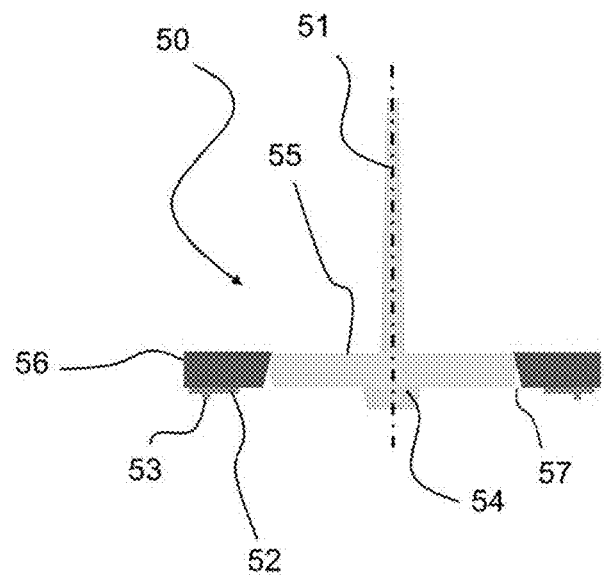
FIG. 3 shows a sectional view of a blank obtained by injecting into the injection mold according to the first embodiment of the invention.

An injected part 50, shown in FIG. 3, is formed during an injection phase with such an injection mold. The injected material is distributed continuously over the annular portion 46 containing the different components to be manufactured, which are connected together by a support 56 of annular shape. The injected material is also present in a deeper cavity in the central part 44 of the injection mold, forming a rod or bar 54 of an injected part 50 commonly called the "sprue puller insert" by which the injected part 50 may be handled, and forming injection sprue 51 in the injection channel of the material, not illustrated. The injected material is also present in the intermediate zone 45 between this central part 44 and the annular portion 46, forming an injection sheet 55 of the injected part 50. In the region of the connection between the peripheral annular portion 46 and the intermediate zone 45, a cutout line 47 is formed, said cutting line forming a precutting line 57 on the resulting injected part. The method thus carries out a step of cutting along this precutting line 57, permitting only the support 56 comprising the components 52, 53, shown in FIG. 4, to be retained.

To facilitate the ejection of such an injected part 50 after the formation thereof, the injection mold also comprises a central ejector 4 which is designed to cooperate with the bar 54 of an injected part. It further comprises support 56 ejectors 6, arranged on the annular portion 46 between the different components to be manufactured. The ejection system of the ejection mold according to the first embodiment thus comprises a plurality of complementary ejectors which are movably mounted inside a first part 1 of the core of the injection mold, which fulfills a guide function of these ejectors.

The intermediate plate 10 thus comprises complementary cutouts 16, which are through-openings, in the region of the ejectors 6 of the first part of the injection mold core, to permit the displacement thereof through the intermediate plate during an ejection phase, in which the ejectors come into direct contact with the injected part to detach it from the subassembly shown.

As has been described, the ejection system may be adapted to the component to be manufactured and may take different forms. However, it is advantageous to have at least one support ejector, irrespective of a component to be manufactured. In order to achieve this, the intermediate plate advantageously comprises at least one second cutout 16 which is a through-opening and is separate from the first cutout 12, this second cutout being designed solely for the passage of an ejector, whilst the primary function of the first cutout is defining the injection cavity which specifically forms a component to be manufactured.

In this embodiment, the multiple ejectors act in the region of the component to be manufactured, and in particular separately in the region of a tenon and a surface of the the component surrounding this tenon but also in the region of the support connecting a plurality of components and/or the central part consisting of the injection sheet. This approach makes it possible to avoid the deformation of the injected part during its ejection from the mold and is particularly suitable for parts which have a large surface area and which at the same time are thin. This approach is also particularly suitable for ejecting a fragile blank, for example formed by the injection of ceramic, which comprises particles of ceramic and a binder during the injection thereof.

The first part 1 of the injection mold core thus comprises a plurality of openings in which different ejectors are arranged so as to be mobile in translation. This first part 1 of the injection mold core forms a guide for these ejectors. The intermediate plate 10 comprises through-openings in the region of these ejectors which are thus able to pass through said intermediate plate during an ejection phase in order to come into contact with the injected material.

Figure 4:
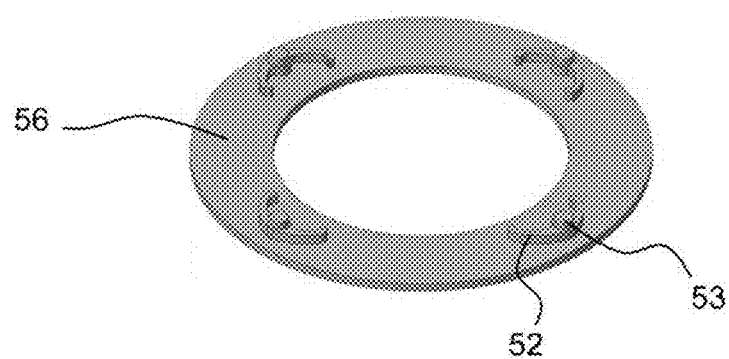
FIG. 4 shows a perspective view of a green body resulting from the injected part of FIG. 3.

As mentioned above, the central part of the injected part 50, shown in FIG. 3, forming an injection sheet 55 is generally removed when opening the mold by cutting along the precutting line 57 and by ejecting by means of the central ejector 4. This results in a ring of annular shape, which is illustrated in FIG. 4 and which comprises a plurality of components fixed to a support 56. Once this ring is consolidated, for example by cooling in the case of a ring made of metal or polymer or by removal of the binder and sintering in the case of a ring made of ceramic, the individual components are separated from the support 56 by flat precision grinding, thus making it possible to define the face 66 of each of the components. In the described example, the components are winding pawls, more particularly shown in FIGS. 8 to 10.

Advantageously, the intermediate plate 10 is produced by LIGA technology. This approach comprises in the known manner the formation of a mold by photolithography, then the deposition of a metal inside the mold. This LIGA technology is advantageous since it makes it possible to obtain an intermediate plate with a high level of precision, whilst enabling a plurality of identical intermediate plates to be reproduced using the same mask. The flanks of this intermediate plate are important since they define the final shape of the injected component. To achieve this, it could be advantageous to use the teaching from the documents EP3670440 and/or EP3670441 during the manufacture of the intermediate plate 10.

As a variant, an intermediate plate may also be produced by conventional machining or by wire machining or by stamping or by laser machining in metal plates.

The pressures and temperatures of the injection method require materials having a sufficient mechanical resistance (Rm) and a geometric stability at a temperature of at least up to 100° C., even up to 300° C. Thus the intermediate plate may be made of nickel or an alloy of nickel, high-speed steel, ASP® steel produced by powder metallurgy, tungsten carbide or any steel conventionally used for the manufacture of molds.

It should be mentioned that the use of the intermediate plate has numerous advantageous. In particular, this intermediate plate defines a significant part of the injection cavity and, in particular, the geometry of the beaks 65 of the winding pawl 60 in the present case. This initial geometry, although reworked by finishing steps such as polishing, is essential for the reliable future performance of the component. Thus when the intermediate plate is worn or if slight modifications are required to increase the performance of the timepiece component, it suffices to change the intermediate plate, potentially also the ejectors. This modular construction of the injection mold provides a flexibility in the form of the intermediate plate, the cutout thereof being able to be slightly modified whilst still permitting the passage or one or more ejectors.

It is important to emphasize that the described injection mold permits micro-injection. It permits the use of different materials, including polymers, composites, metals or more particularly ceramics. It thus permits the manufacture of a timepiece component, in particular made of ceramic.

The invention is not limited to the described embodiment. In particular, more complex geometries may be formed by using a plurality of intermediate plates, in particular two, three or even more.

Figure 5:
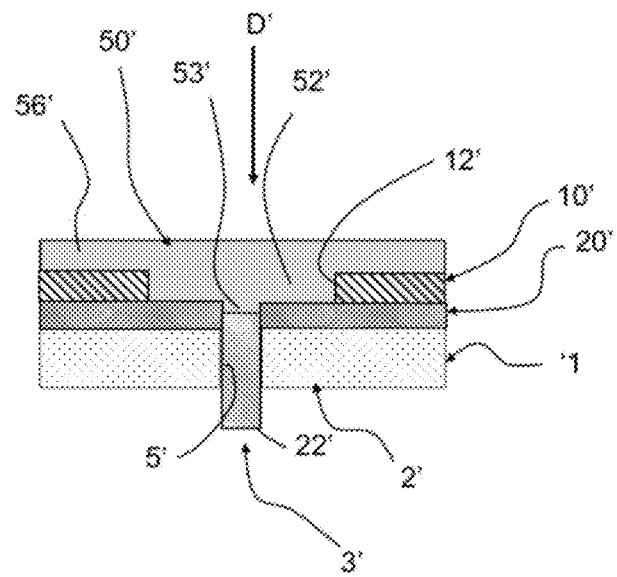
FIG. 5 shows a schematic sectional view of a subassembly of an injection mold according to a second embodiment of the invention.
Figure 7:
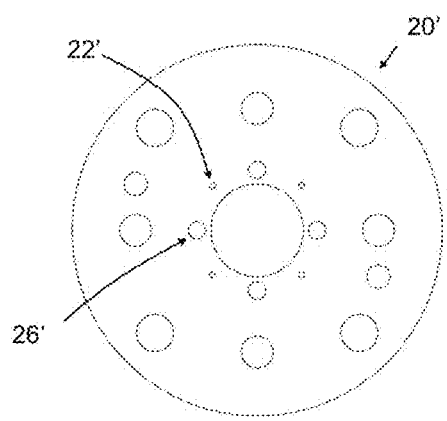
FIG. 7 shows a view from above of a second intermediate plate 20' according to the second embodiment of the invention.

Thus FIGS. 5 to 7 illustrate an injection mold according to a second embodiment comprising two intermediate plates. This second embodiment will be illustrated by way of example in the case of the manufacture of a blank and identical components to those described in the example of the injection mold according to the first embodiment.

FIG. 5 thus shows a first part 1' of an injection mold core according to a second embodiment, cooperating with a first intermediate plate 10' and a second intermediate plate 20'. These two intermediate plates 10', 20' respectively illustrated in FIGS. 6 and 7, each respectively comprise a cutout 12', 22' (through-openings) and the cutouts 12', 22' thereof are at least partially superposed. The subassembly formed by the first part 1' of the injection mold core and the two intermediate plates 10', 20' is thus based on the superposition of three elements in the injection direction, the second intermediate plate 20' being positioned between the first part 1' of the injection mold core and the first intermediate plate 10'. This subassembly defines a cavity which permits the formation of an injected part 50' during an injection phase. It should be mentioned that in such a phase a second part, not shown, of the injection mold core cooperates with this subassembly to form a closed cavity.

The second part of the injection mold core is moved closer to or away from the first part in a direction of translation D', called the injection direction or closing direction of the mold, as mentioned above. The material is injected into the injection cavity in this same direction D'. Advantageously, the two parts of the injection mold core and the intermediate plates have substantially planar surfaces perpendicular to the injection direction. Moreover, different ejectors are mobile in this same injection direction D'.

The first part 1' of the injection mold core also comprises a cutout 5' superposed at least partially on the cutouts 12', 22' of the intermediate plates 10', 20' in the injection direction and closing direction of the mold D'. A component ejector 3' is arranged in the cutout 5' of the first part 1'. In the injection configuration, this ejector 3' is positioned such that its distal surface is positioned so as to define the height of the tenon 53'. This distal surface is thus part of the surface of the injection cavity. In other words, it contributes to defining the shape of a component. This surface is retracted relative to the surfaces of the two intermediate plates 10', 20' defining the injection cavity. This surface makes it possible to define a part of greater thickness of the injected part 50', as will be described in detail below.

As illustrated in FIG. 6, the cutout 12' of the first intermediate plate 10' is a through-opening. The same also applies to the cutout 22' of the second intermediate plate 20'. These two cutouts 12', 22' are also positioned opposite the cutout 5' of the first part 1' such that the ejector 3' is positioned according to a shape substantially corresponding to that of the cutout 22' of the second intermediate plate 20'. This cutout 22' of the second intermediate plate 20' contributes to the formation of a part of the injection cavity of the injection mold which more precisely defines a tenon 53' of an injected part 50' to be manufactured. It also permits the displacement of at least one ejector 3' which is designed to act more precisely on this tenon 53', which is principally guided by the first part 1' of the injection mold core and which permits the ejection of a component after an injection phase. The cutout 12' of the first intermediate plate 10' also contributes to the formation of the injection cavity of the injection mold, more specifically a part of the injection cavity defining the component 52' of the injected part 50' apart from the tenon 53'.

Due to this design of the injection mold, the injection cavity makes it possible to form an injected part 50' similar to that obtained by the injection mold according to the first embodiment, comprising a support 56' which connects the separate components together and does not form part of a component to be manufactured. A component is formed by a first portion 52' of the injected part 50' and by a second portion 53' of the injected part 50' superposed on the ejector 3'.

Figure 8:
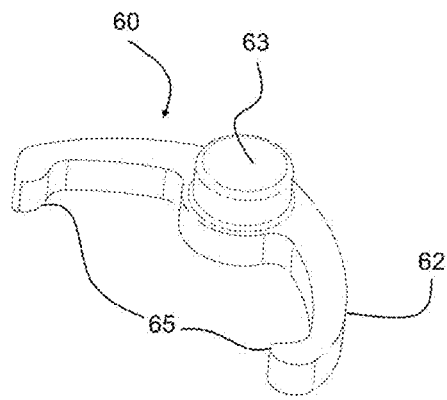
FIG. 8 shows a perspective view of a winding pawl formed by an injection mold according to the invention.
Figure 9:
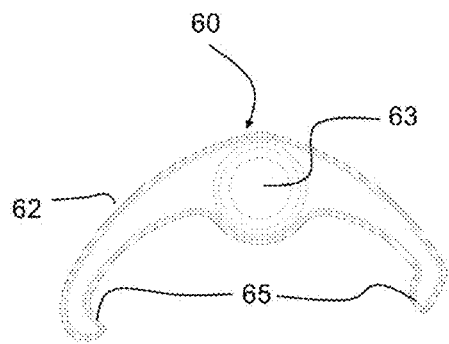
FIG. 9 shows a view from above of the winding pawl formed by an injection mold according to the invention.
Figure 10:
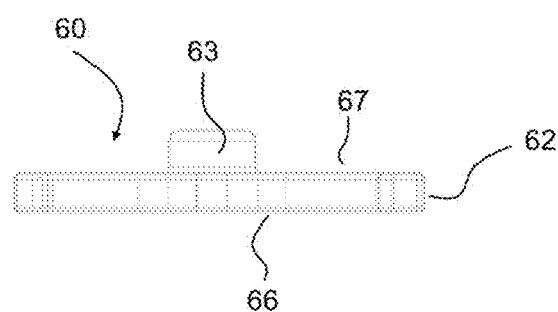
FIG. 10 shows a side view of the winding pawl formed by an injection mold according to the invention.

It should be mentioned that, in the illustrated example, the injection mold according to the second embodiment is thus used to manufacture a timepiece component and more specifically a winding pawl 60, particularly shown in FIGS. 8 to 10, as in the case of the example illustrated by the first embodiment.

It is thus apparent that the injection cavity of the injection mold designed to form an injected part 50', which is injection-molded, is principally delimited in the first injection position of the injection mold by:
  the first cutout 12' of the at least one first intermediate plate 10', 20
  the first cutout 22' of the at least one second intermediate plate 20',
  an end of an ejector 3', the end of said ejector 3' being located in the thickness of one of the intermediate plates, even exceeding one or more of the intermediate plates, and this ejector 3' being arranged and guided by the first part 1' of the mold core, and by
  the second part of the mold core, not shown, which defines the rear face of the injected part 50', for example a planar face.

More specifically, the flank of the cutout 12' of the first intermediate plate 10' forms the surface of the cavity of the injection mold which defines the periphery, the lateral surface 62, of the timepiece component, apart from the tenon 63. The flank of the cutout 22' of the second intermediate plate 20' forms the surface of the cavity of the injection mold which defines the periphery of the tenon of the timepiece component. The upper surface of the second intermediate plate 20' also defines a surface 67 of the timepiece component and the second part of the mold core defines the rear face of the injected part 50'.

This second embodiment provides an additional flexibility relative to the first embodiment, since the separate portions of the same component are ultimately defined by the separate and movable intermediate plates of an injection mold. It is thus possible to modify just one of the two portions by modifying a single intermediate plate, without modifying the other portion or the other intermediate plate. On the other hand, only the end of the tenon is defined by a part (ejector 3') which is different from the two intermediate plates. It is thus possible to modify the shape of the component, in particular the shape of a pawl beak, in a manner which is even more versatile and/or in particular to vary the height of the tenon without changing the first part 1' of the injection mold core, by intervening only relative to the intermediate plates and/or the position of the ejector 3'.

Finally, this second embodiment may be extended to any injection mold comprising at least two intermediate plates which are at least partially superposed, each comprising at least one first cutout delimiting the surfaces of the injection cavity, the first respective cutouts thereof being superposed to define complementary geometries of said injection cavity. These first cutouts and/or further cutouts of the intermediate plates are also designed to permit the passage of the same ejector of an injected part through the at least two intermediate plates.

FIGS. 6 and 7 illustrate the two intermediate plates 10' and 20'. As in the case of the first embodiment, the injection mold is provided to have a substantially cylindrical shape, forming a blank which makes it possible to obtain a green body of annular shape comprising a plurality of components. The intermediate plates thus have a disk shape, comprising cutouts to form a part of the injection cavity and/or for the passage of different ejectors. Thus apart from the above-mentioned first cutouts 12', 22', these intermediate plates 10', 20' respectively comprise additional superposed cutouts 16', 26' permitting the passage of complementary ejectors of an injected part 50', not shown, in a similar manner to the first embodiment, in particular described relative to FIG. 2.

It should be mentioned that the intermediate plates 10', 20' may be manufactured by the same methods as those described within the context of the first embodiment.

Naturally, the invention is not limited to the described embodiments, the plates being able to take different forms from those described. An intermediate plate may have, for example, a blind cutout and/or a positive relief and/or texturization in the region of the injection cavity of the injection mold. Moreover, the intermediate plate(s) is/are movably mounted on an injection mold so as to permit their being changed independently of one another if required.

The invention also relates to an intermediate plate per se. Such an intermediate plate comprises at least one first cutout and is designed for the movable arrangement thereof between two mobile parts of an injection mold, such that said at least one first cutout forms a part of the injection cavity of said injection mold. This at least one first cutout is a through-opening. The intermediate plate may also comprise at least one blind cutout and/or at least one texturization of the surface of the plate forming the injection cavity. It may also comprise at least one second cutout to permit the passage of an ejector of an injection mold. It may be present in a material having a mechanical resistance designed to support the pressure of an injection mold and having a geometric stability up to a temperature of at least 100° C., even up to 300° C., in particular made of metal such as a steel, or made of tungsten carbide.

The invention also relates to a method for the manufacture of an intermediate plate for an injection mold as described above, wherein it comprises a step of manufacturing the intermediate plate by galvanic deposition, in particular by the LIGA method, or by machining a metal plate, in particular by wire or laser machining, or by stamping.

The invention also relates to a method for the manufacture of a timepiece component and a timepiece, in particular a wristwatch, wherein it comprises a step of injecting a material into the injection cavity of an injection mold as described above. Advantageously, such a material is a ceramic-based material, i.e. it comprises at least 50% ceramic by weight. The manufacture of a timepiece may comprise the integration of one or more timepiece components manufactured entirely or partially by injecting material into an injection mold according to the invention, as described above.

The method for the manufacture of a timepiece component may comprise a step consisting of selecting at least one intermediate plate of said injection mold from different intermediate plates adapted to the injection mold in order to determine the geometry of the component.

The method for the manufacture of a timepiece component may also comprise a separate step prior to the manufacture of said intermediate plate by galvanic deposition, in particular by the LIGA method, or by machining a metal plate, in particular by wire or laser machining, or by stamping.

The invention has been implemented within the context of the manufacture of a timepiece component. It could also be applied to the manufacture of any component of small dimensions, i.e. generally in the field of micro-injection. In an even more general manner, the solution could be implemented by any injection mold, irrespective of its dimensions.

The invention claimed is:

1. An injection mold, comprising:
    a mold core comprising a first part and a second part, wherein the first part and the second part are mobile relative to one another between a first injection position in which the two parts are moved together to form an injection cavity permitting the injection of a material to form an injected part comprising at least one component, and a second demolding position in which the two parts are moved away from one another to permit the demolding of the injected part,
    at least one ejector designed to contribute to the demolding of the injected part, and
    at least one intermediate plate, which is separate from the two parts of the mold core, and movable,
    wherein the at least one intermediate plate is arranged between the two parts of the mold core, and has at least one first cutout forming at least one part of the injection cavity of the injection mold,
    wherein, in the injection cavity, a respective surface of each of (i) the mold core, (ii) the at least one first cutout of the intermediate plate, and (iii) the at least one ejector contributes to defining a shape of the injected part.

2. The injection mold as claimed in claim 1, wherein the two parts of the mold core are mobile relative to one another in translation in a direction of the mold, and wherein the at least one intermediate plate is present as a substantially planar plate positioned in a plane perpendicular to the direction of the mold.

3. The injection mold as claimed in claim 1, wherein the at least one first cutout of the at least one intermediate plate is a through-opening.

4. The injection mold as claimed in claim 1, wherein the at least one intermediate plate also comprises at least one blind cutout, at least one texturization of the surface of the plate forming at least one part of the injection cavity, or at least one blind cutout and at least one texturization of the surface of the plate forming at least one part of the injection cavity.

5. The injection mold as claimed in claim 1, wherein the injection mold comprises at least two intermediate plates which are at least partially superposed, each of the at least two intermediate plates comprising at least one respective first cutout, and each of the at least two intermediate plates delimiting at least one part of the injection cavity, the respective first cutouts being superposed.

6. The injection mold as claimed in claim 1, wherein the at least one ejector makes it possible to eject an injected part, by passing through the at least one first cutout of the at least one intermediate plate.

7. The injection mold as claimed in claim 1, wherein the at least one intermediate plate comprises at least one additional cutout, which is a through-opening and is separate from the first cutout, the at least one additional cutout being designed for the passage of at least one additional ejector.

8. The injection mold as claimed in claim 1, wherein the injection cavity which is configured to form an injected part comprising at least one component is principally delimited by:
    the first part of the mold core, at least one ejector of the first part, or the first part of the mold core and at least one ejector of the first part,
    the at least one first cutout of the at least one intermediate plate,
    at least one end of at least one second ejector, and
    the second part of the mold core.

9. The injection mold as claimed in claim 1, wherein the first part of the mold core, the second part of the mold core, or both the first part and the second part of the mold core, against which the at least one first intermediate plate bears, is or are planar.

10. The injection mold as claimed in claim 1, wherein at least one intermediate plate comprises a plurality of first cutouts designed to define simultaneously the geometry of a plurality of injected components, and the injection cavity comprises a section located in a plane parallel to that of the at least one intermediate plate which is configured so that the different injected components remain connected together by an injection-molded support after ejection from the injection mold.

11. The injection mold as claimed in claim 1, wherein the intermediate plate is in a material having a mechanical resistance designed to support the pressure of an injection mold and having a geometric stability up to a temperature of at least 100° C.

12. The injection mold as claimed in claim 1, wherein flanks of the at least one first cutout define a peripheral lateral surface of the component, and wherein a distal surface of the ejector arranged in the injection cavity defines a surface of a portion of the component having greater thickness than a thickness of the peripheral lateral surface of the component.

13. The injection mold as claimed in claim 2, wherein the intermediate plate further comprises at least one blind cutout, at least one texturization of the surface of the intermediate plate forming the injection cavity, or at least one blind cutout and at least one texturization of the surface of the intermediate plate forming the injection cavity.

14. The injection mold as claimed in claim 2, wherein the intermediate plate comprises at least one additional cutout permitting passage of at least one additional ejector of an injection mold.

15. The injection mold as claimed in claim 5, wherein each of the intermediate plates comprises at least one additional cutout, which is a through-opening, the respective additional cutouts being at least partially superposed so as to permit the passage of a respective same ejector.

16. The injection mold as claimed in claim 10, wherein the injection mold comprises at least one mobile ejector making it possible to eject the injected part by acting in a region of the injected support.

17. The injection mold according to claim 12, wherein the distal surface of the ejector is arranged in a through-hole of another intermediate plate located in a plane parallel to a plane of the at least one intermediate plate.

18. A method for the manufacture of an intermediate plate for an injection mold, wherein the method comprises:
    manufacturing the intermediate plate by galvanic deposition, by machining a metal plate, or by stamping, and
    assembling the intermediate plate, an injector and a mold core,
    so as to obtain the injection mold according to claim 1.

19. A method for the manufacture of a timepiece component or a timepiece, wherein the method comprises:
    providing the injection mold as claimed in claim 1, and
    injecting a material into the injection cavity of the injection mold.

20. The method for the manufacture of a timepiece component or a timepiece as claimed in claim 19, wherein the injected material is a ceramic-based material.

21. The method for the manufacture of a timepiece component or a timepiece as claimed in claim 19, wherein the timepiece component is a pawl.

22. The method for the manufacture of a timepiece component or a timepiece as claimed in claim 19, wherein the method comprises
    selecting at least one intermediate plate adapted to the injection mold among a set of different intermediate plates, and
    inserting the selected intermediate plate into the injection mold before injecting the material.

* * * * *